(12) United States Patent
Whitehead et al.

(10) Patent No.: US 12,030,431 B2
(45) Date of Patent: Jul. 9, 2024

(54) TRIM COMPONENT WITH FLEXIBLE CAPACITIVE SENSORS AND METHOD OF MAKING

(71) Applicant: Inteva Products, LLC, Troy, MI (US)

(72) Inventors: David Whitehead, Rochester Hills, MI (US); Jeremy M. Husic, Washington, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 275 days.

(21) Appl. No.: 17/376,685

(22) Filed: Jul. 15, 2021

(65) Prior Publication Data

US 2022/0018689 A1 Jan. 20, 2022

Related U.S. Application Data

(60) Provisional application No. 63/054,079, filed on Jul. 20, 2020.

(51) Int. Cl.
*B60Q 3/54* (2017.01)
*B60R 13/02* (2006.01)

(52) U.S. Cl.
CPC ............... *B60Q 3/54* (2017.02); *B60R 13/02* (2013.01); *B60R 2013/0287* (2013.01)

(58) Field of Classification Search
CPC .. B60Q 3/54; B60Q 3/14; B60R 13/02; B60R 2013/0287; B60R 16/02
USPC .................. 324/686, 658, 649, 600
See application file for complete search history.

(56) References Cited

U.S. PATENT DOCUMENTS

| | | | |
|---|---|---|---|
| 6,214,157 B1* | 4/2001 | Spengler | B29C 53/36 |
| | | | 264/296 |
| 6,497,947 B1* | 12/2002 | Blais | B32B 27/32 |
| | | | 428/319.3 |
| 2008/0157605 A1 | 7/2008 | Bowden et al. | |
| 2014/0167434 A1* | 6/2014 | Galarza | B32B 9/045 |
| | | | 112/475.08 |
| 2016/0306482 A1 | 10/2016 | Gmyr et al. | |
| 2017/0206831 A1* | 7/2017 | Schmittat | G06F 3/017 |
| 2019/0126853 A1* | 5/2019 | Cannon | H05B 3/86 |
| 2020/0079189 A1* | 3/2020 | Kito | B60J 5/042 |
| 2020/0083886 A1 | 3/2020 | Vemulapati et al. | |
| 2020/0139814 A1 | 5/2020 | Galan Garcia et al. | |
| 2020/0164795 A1 | 5/2020 | Degrote et al. | |
| 2021/0188091 A1* | 6/2021 | Whitehead | B60K 37/06 |

(Continued)

FOREIGN PATENT DOCUMENTS

| | | |
|---|---|---|
| CN | 109398258 A | 3/2019 |
| EP | 2269797 A1 | 1/2011 |

(Continued)

OTHER PUBLICATIONS

Chinese Office Action for Chinese Application No. 202121659965.3 dated Dec. 17, 2021.

(Continued)

*Primary Examiner* — Giovanni Astacio-Oquendo
(74) *Attorney, Agent, or Firm* — CANTOR COLBURN LLP

(57) ABSTRACT

A sensor and lighting element configured to be positioned directly behind a first surface of an automotive trim article. A trim element, included: a sensor element and lighting element; and a hidden front functionality thermoplastic polyolefin (TPO) film.

19 Claims, 16 Drawing Sheets

(56) References Cited

U.S. PATENT DOCUMENTS

2021/0347297 A1* 11/2021 Cuvillier .............. G02B 6/0045
2023/0347816 A1* 11/2023 Cuvillier .............. G02B 5/0215

FOREIGN PATENT DOCUMENTS

| KR | 20180085649 A | 7/2018 |
|----|---------------|--------|
| WO | 2018013557 A1 | 1/2018 |
| WO | 2019165441 A1 | 8/2019 |
| WO | 2020018470 A1 | 1/2020 |

OTHER PUBLICATIONS

FR SR issued Feb. 20, 2023.
CNIPA Notification of First Office Action corresponding to CN Application No. 202110819462.6; Issue Date, Apr. 13, 2024.

\* cited by examiner

TRIM COMPONENT WITH FLEXIBLE CAPACITIVE SENSORS AND METHOD OF MAKING

CROSS REFERENCE TO RELATED APPLICATIONS

This application claims the benefit of U.S. Provisional Patent Application No. 63/054,079 filed on Jul. 20, 2020 the entire contents of which are incorporated herein by reference thereto.

BACKGROUND

Exemplary embodiments of the present disclosure pertain to sensor elements and lighting elements that can be used with a trim component.

In order to sense through a soft surface such as one that has a substrate, foam, and a skin material, the sensor is typically located on the rear of the substrate and has to sense through the complete stack up of materials. This can cause several problems. The sensitivity of such an arrangement can be reduced because of the fundamental way a capacitive sensor works. For the same reason, the signal to noise ratio can be lower making it more difficult to interpret the interaction of the operator with the sensing element. These conditions affect how close together sensor elements (and icons) can be placed.

Some attempts to locate sensing and lighting elements between the skin material and the substrate have resulted in a construction where components can be felt by the operator. This is a very undesirable condition.

Applications for sensing through a soft surface are usually accompanied by a requirement to have an illuminated icon to complete the user interface. Placing a light source on the rear of the substrate that drives light through the entire stack up of material can be very problematic as light intensity at the surface can be very poor and color shift will be very evident. Moreover, each of the materials in the path of the light can change their color shifting function over time and with other environmental influences. To minimize these effects, applications seek to minimize foam thickness and to use foams that are more transparent. More transparent foams are under development but are not available yet. Minimizing foam thickness is contrary to the theme of many vehicles were softness is sought. Lighting from the back of the part also increases the light dispersion. If icons/symbols are close together, light intended to illuminate one icon also inadvertently partially lights surrounding icons (light bleed). This can negatively impact the design and spacing of icons affecting the overall user experience.

BRIEF SUMMARY

The present disclosure uniquely addresses the known issues of other designs.

The disclosure of the present application seeks to address the shortcomings of these systems by moving the sensing and lighting elements as close to the first surface of the part as possible, thus removing many layers from the sensing and lighting path. The construction of the disclosed embodiments uses materials that are themselves soft, and in combination with foam that is now behind the elements, provide the ultimate in softness. The sensitivity of the disclosed embodiments is the best possible and the signal to noise ratio is also the best possible with this arrangement. With the greatly reduced light path of this invention, light transmission losses are the minimum possible and the same is true for color shift. Embodiments disclosed herein actively addresses light bleed by incorporating blackout features between icons/symbols.

While some applications have components the operator can feel, embodiments of the disclosure directly addresses that problem. By using a stretchable sensor design and by embedding components in a slightly harder but thin layer the operator cannot feel components.

Disclosed is a trim element, including: a sensor element and lighting element; and an outer show surface layer, wherein the sensor element and lighting element is directly secured to a back side of the outer show surface layer.

In addition to one or more of the features described above, or as an alternative to any of the foregoing embodiments, the outer show surface layer is formed from a thermoplastic polyolefin with a plurality of hidden icons that are only visible from an exterior show surface of the outer show surface layer when they are illuminated by a light source of the sensor element and lighting element.

In addition to one or more of the features described above, or as an alternative to any of the foregoing embodiments, the sensor element and lighting element includes flexible capacitive sensors.

In addition to one or more of the features described above, or as an alternative to any of the foregoing embodiments, the sensor element and lighting element includes a base layer; a light emitting diode (LED) frame; and an upper layer.

In addition to one or more of the features described above, or as an alternative to any of the foregoing embodiments, the base layer includes a plurality of sensor elements, a ground plane, and associated traces all located on a stretchable film.

In addition to one or more of the features described above, or as an alternative to any of the foregoing embodiments, the plurality of sensor elements are flexible capacitive sensors.

In addition to one or more of the features described above, or as an alternative to any of the foregoing embodiments, a monochrome layer is printed over the plurality of sensor elements.

In addition to one or more of the features described above, or as an alternative to any of the foregoing embodiments, a reflective dot pattern is applied to the monochrome layer.

In addition to one or more of the features described above, or as an alternative to any of the foregoing embodiments, the light emitting diode (LED) frame includes a flexible frame that carries a plurality of light emitting diodes (LEDs).

In addition to one or more of the features described above, or as an alternative to any of the foregoing embodiments, the plurality of light emitting diodes (LEDs) are side firing light emitting diodes.

In addition to one or more of the features described above, or as an alternative to any of the foregoing embodiments, the upper layer is a molded-on layer that includes light guides and a blackout material each being separately molded onto an assembly comprising the base layer and the light emitting diode (LED) frame.

In addition to one or more of the features described above, or as an alternative to any of the foregoing embodiments, the light guides comprise an optically clear silicone while the blackout material comprises a black silicone.

In addition to one or more of the features described above, or as an alternative to any of the foregoing embodiments, the optically clear silicone and the black silicone are applied via a two shot molding process.

In addition to one or more of the features described above, or as an alternative to any of the foregoing embodiments, the optically clear silicone is of a thickness that prevents a user from feeling a plurality of light emitting diodes (LEDs) of the light emitting diode (LED) frame through the outer show surface layer.

In addition to one or more of the features described above, or as an alternative to any of the foregoing embodiments, the sensor element and lighting element is directly secured to the back side of the outer show surface layer via an optically clear adhesive.

In addition to one or more of the features described above, or as an alternative to any of the foregoing embodiments, the trim element is an interior trim piece of a vehicle.

Also disclosed is a method of forming a trim element, including: securing a sensor element and lighting element to an outer show surface layer, wherein the sensor element and lighting element is directly secured to a back side of the outer show surface layer.

In addition to one or more of the features described above, or as an alternative to any of the foregoing embodiments, the outer show surface layer is formed from a thermoplastic polyolefin with a plurality of hidden icons that are only visible from an exterior show surface of the outer show surface layer when they are illuminated by a light source of the sensor element and lighting element.

In addition to one or more of the features described above, or as an alternative to any of the foregoing embodiments, the sensor element and lighting element includes a base layer; a light emitting diode (LED) frame; and an upper layer, and wherein the base layer includes a plurality of sensor elements, a ground plane, and associated traces all located on a stretchable film.

In addition to one or more of the features described above, or as an alternative to any of the foregoing embodiments, the upper layer is a molded-on layer that includes light guides and a blackout material each being separately molded onto an assembly comprising the base layer and the light emitting diode (LED) frame.

BRIEF DESCRIPTION OF THE FIGURES

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the attached FIGS.

Figure 1:
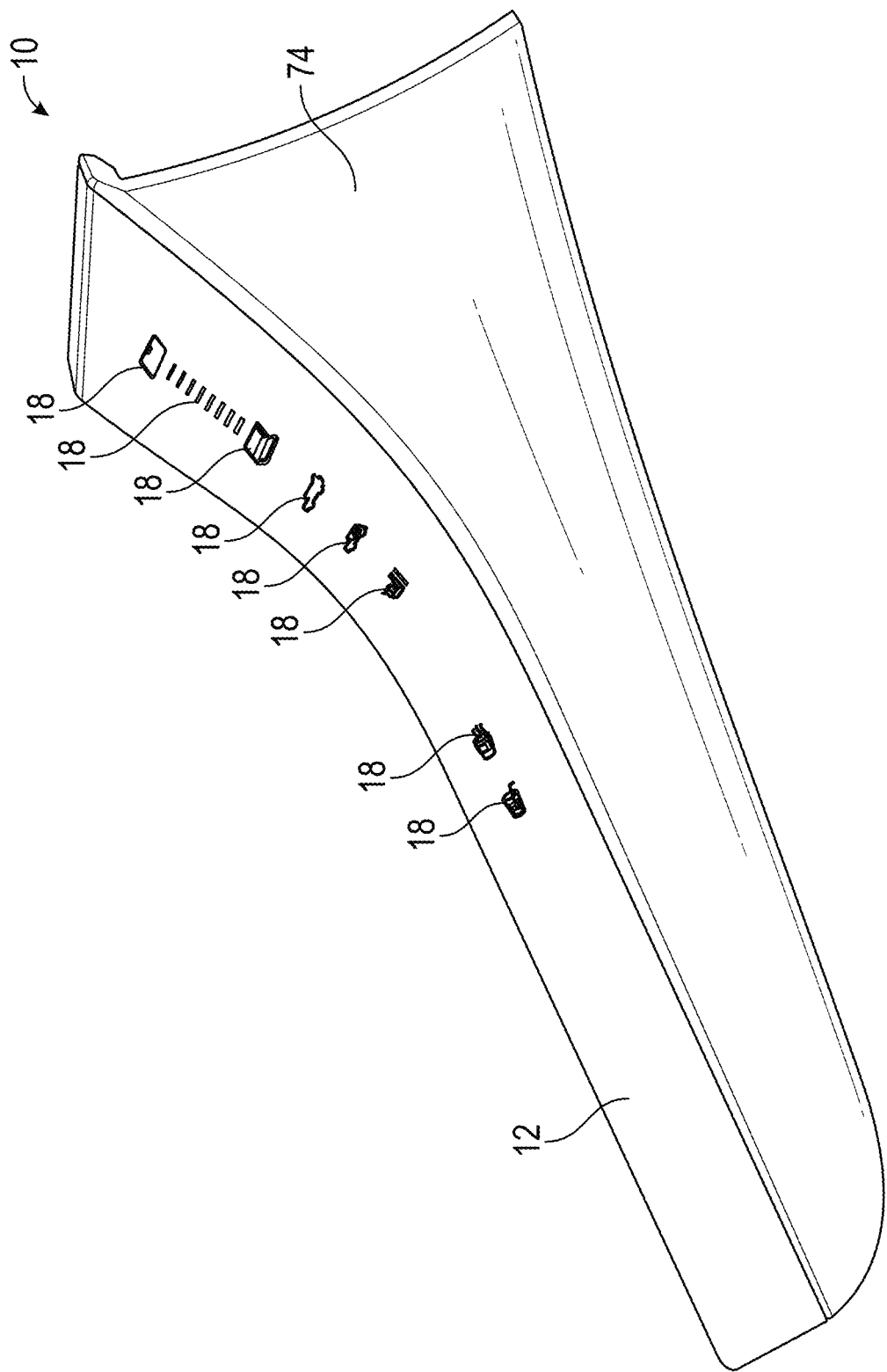
FIG. 1 is a perspective view of a trim component with flexible capacitive sensors in accordance with one non-limiting embodiment of the present disclosure.

Referring now to FIG. 1 a perspective view of a trim component or trim element 10 with flexible capacitive sensors in accordance with one non-limiting embodiment of the present disclosure is illustrated. In one non-limiting embodiment, the trim component may be an interior trim piece of a vehicle. Non-limiting examples include arm rests, center consoles, interior trim panels, portions of a dashboard as well as any other suitable portion of a vehicle.

Figure 2:
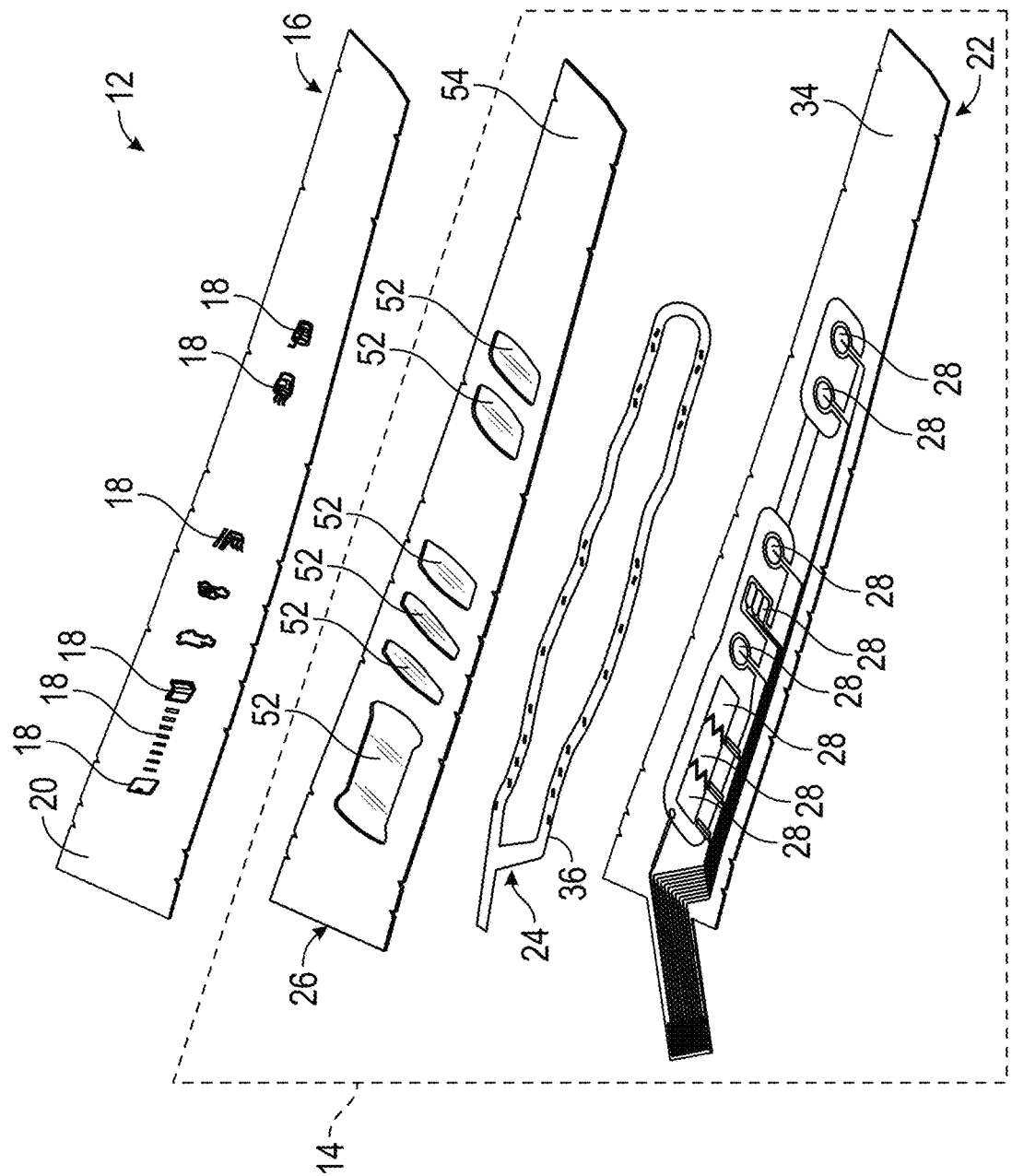
FIGS. 2 and 3 are exploded views of a portion of the trim component with flexible capacitive sensors in accordance with one non-limiting embodiment of the present disclosure.
Figure 3:
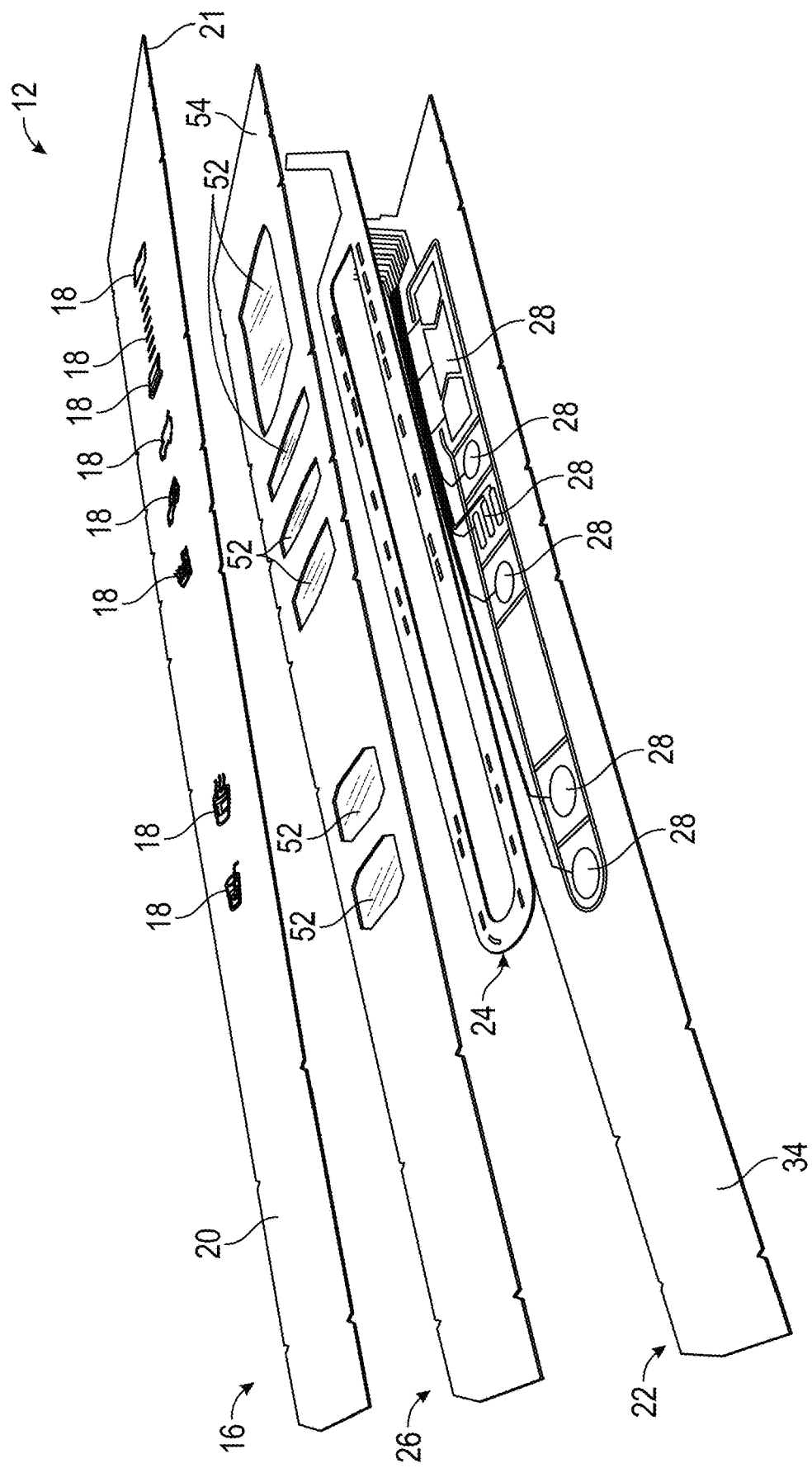
Figure 4:
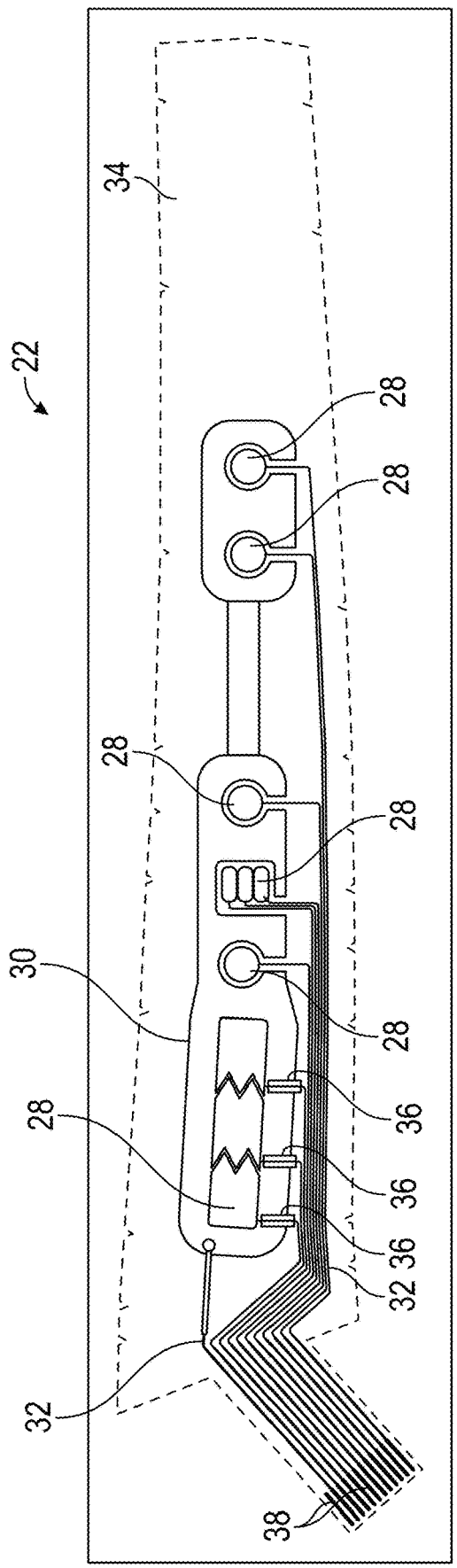
FIGS. 4-6 are views illustrating a sensor element of the trim component in accordance with one non-limiting embodiment of the present disclosure.
Figure 5:
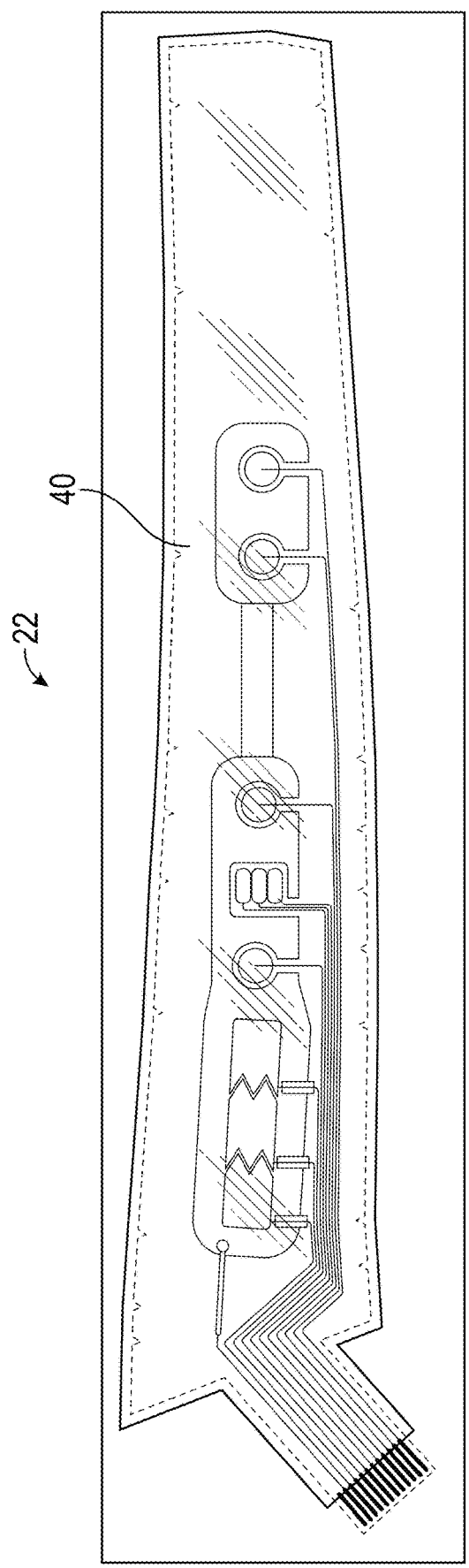
Figure 6:
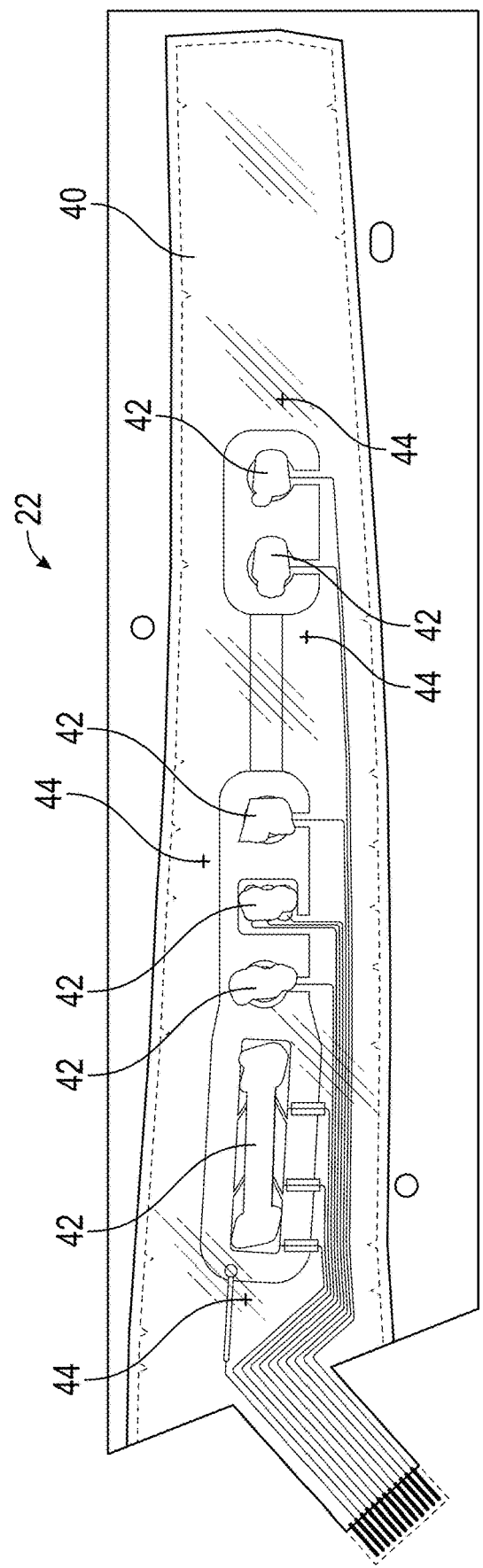
Figure 7:
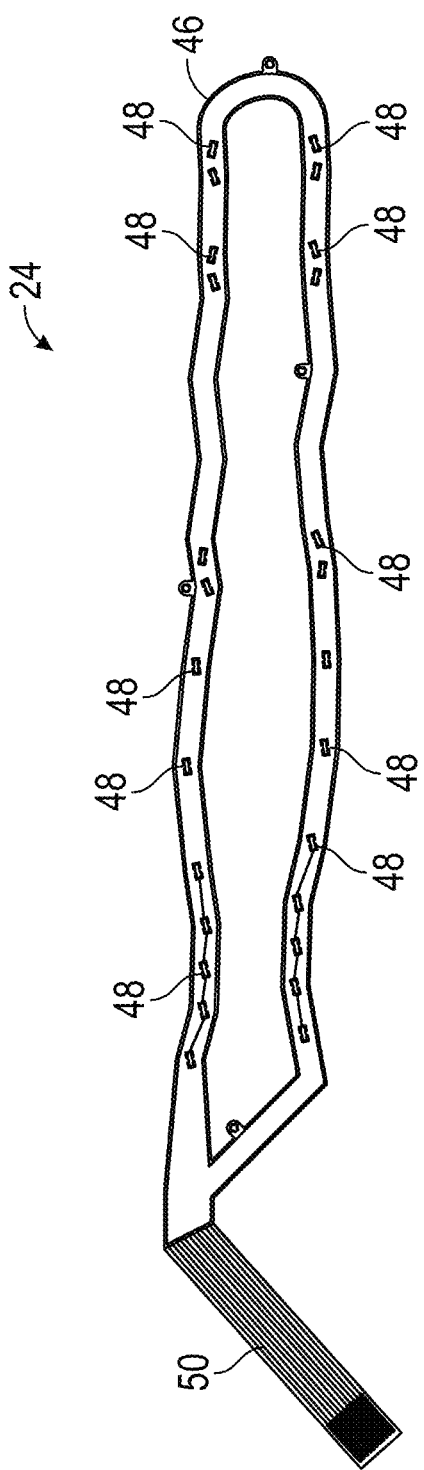
FIG. 7 is a view illustrating a light emitting diode (LED) sub assembly of the trim component in accordance with one non-limiting embodiment of the present disclosure.
Figure 8:
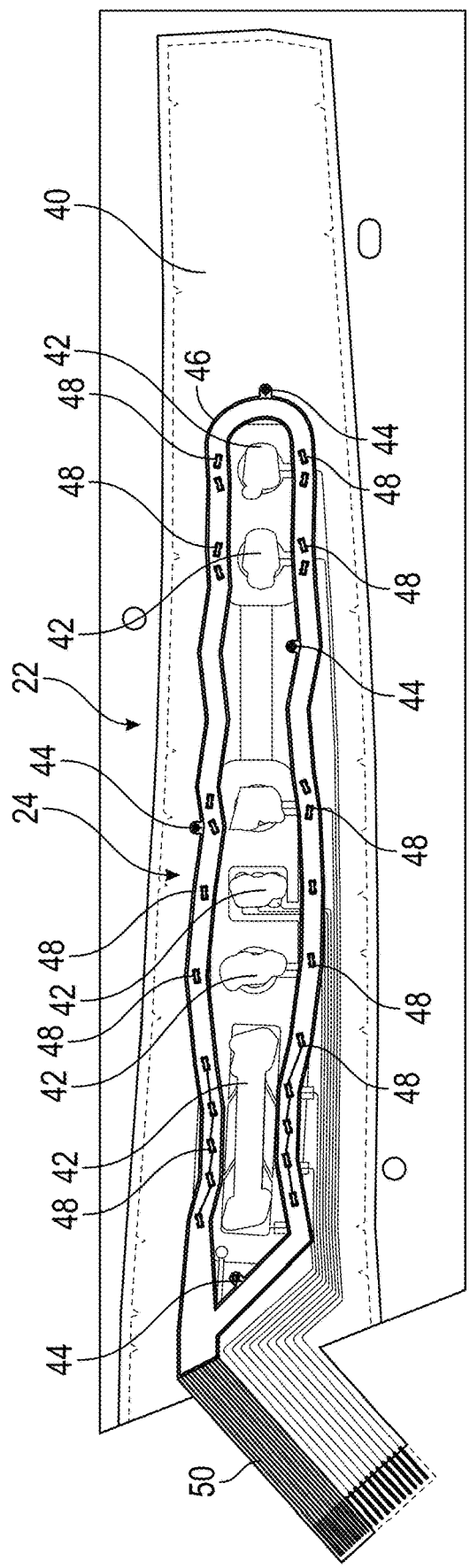
FIGS. 8-12 are views illustrating the sensor element and the light emitting diode (LED) sub assembly of the trim component in accordance with one non-limiting embodiment of the present disclosure.
Figure 9:
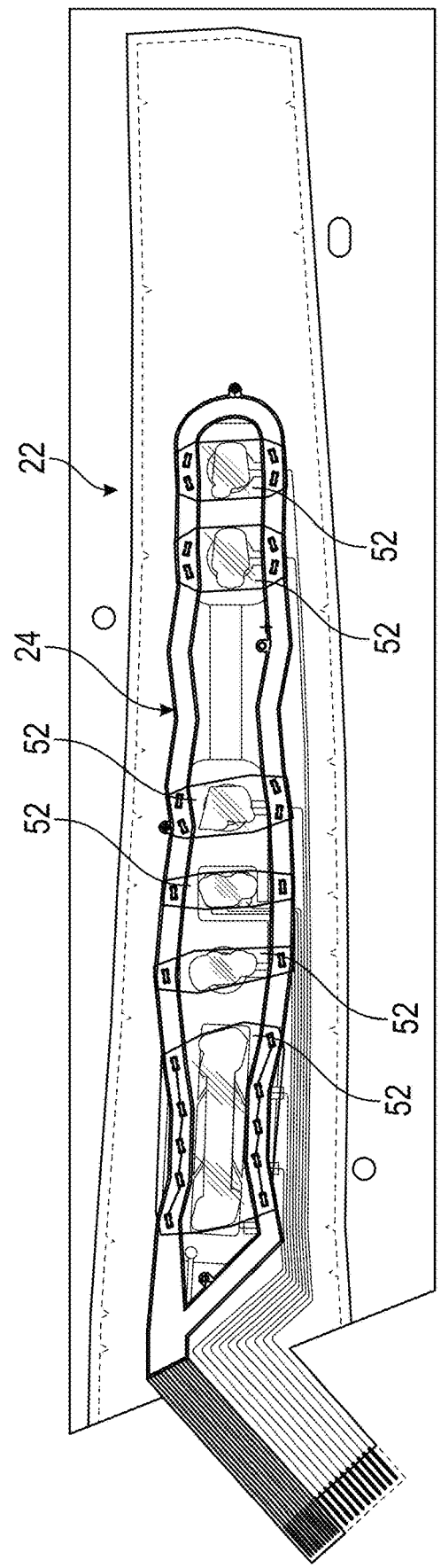
Figure 10:
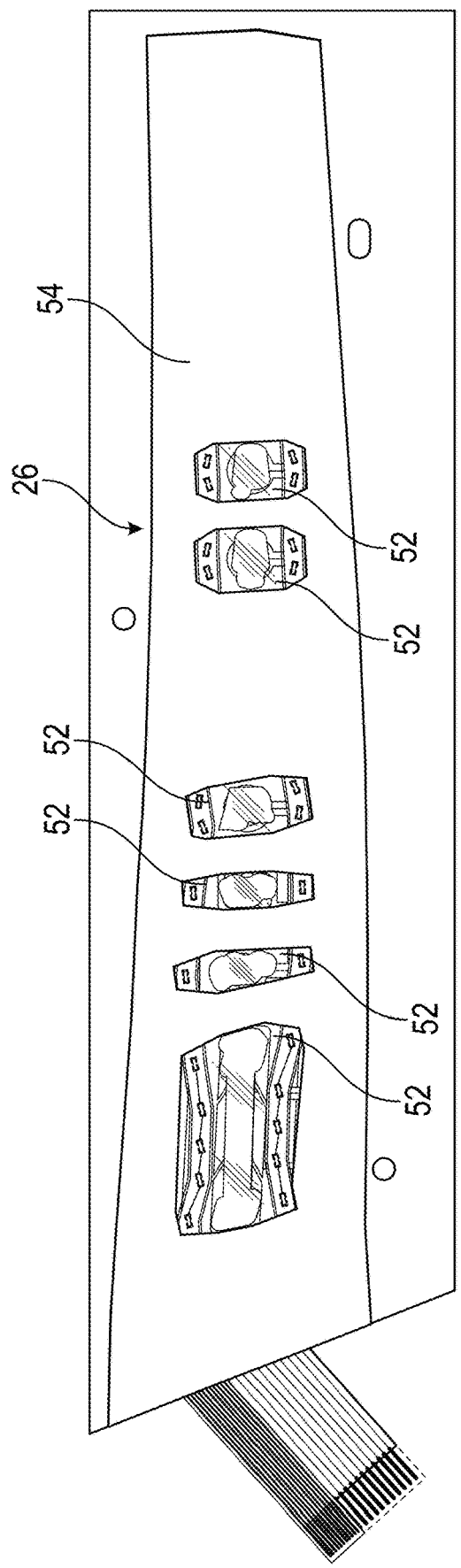
Figure 11:
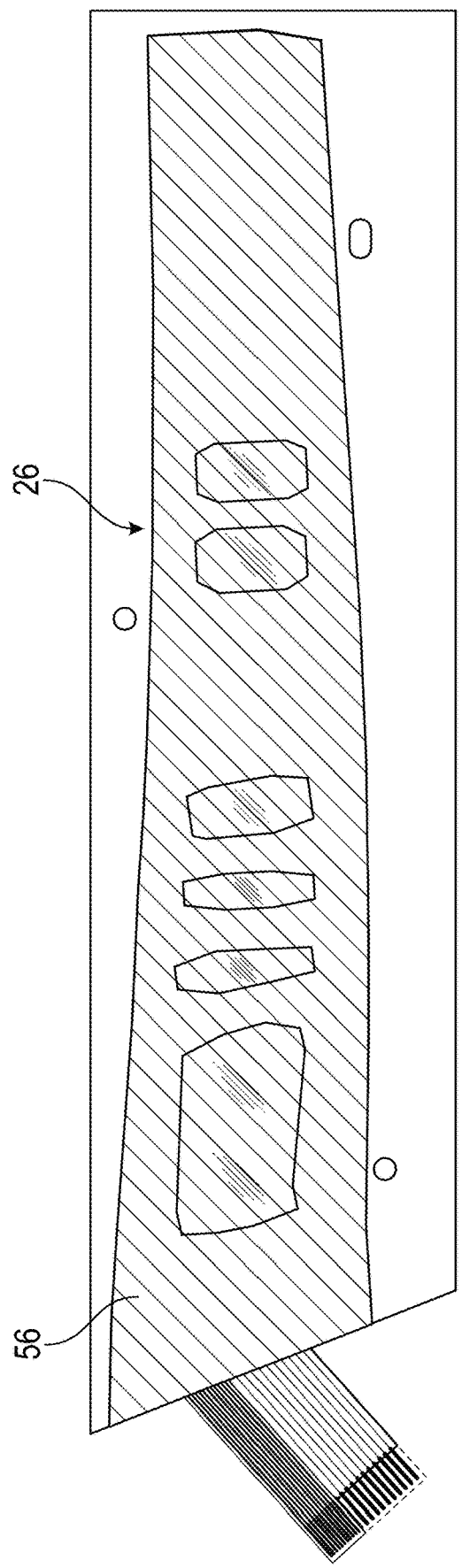

FIGS. 2 and 3 are exploded views of a trim component or trim element or a portion 12 of the trim component or trim element 10 with flexible capacitive sensors in accordance with one non-limiting embodiment of the present disclosure. The portion 12 includes a sensor and lighting element 14 that is directly secured to an outer show surface layer 16. In accordance with one non-limiting embodiment of the present disclosure the outer show surface layer 16 may be formed from a thermoplastic polyolefin (TPO) with a plurality of hidden icons 18 that are only visible from an exterior show surface 20 of the outer show surface layer 16 when they are illuminated by a light source located behind the outer show surface layer 16. Alternatively, the icons 18 are visible without being illuminated (e.g., printed with a visible indicia that is capable of being illuminated from its backside to make it brighter) and they are further illuminated by the light source such that they are clearly visible at night or when the area around the trim element 10 is dark. In yet another embodiment, the outer show surface layer 16 may comprise visible icons 18 and hidden icons 18, wherein the hidden icons 18 are only visible from an exterior show surface 20 of the outer show surface layer 16 when they are illuminated by the light source located behind the outer show surface layer 16 and the visible icons 18 may be illuminated by the light source located behind the outer show surface layer 16 or alternatively, the visible icons 18 are not illuminated by the light source located behind the outer show surface layer 16.

It is also, understood that materials other than a thermoplastic polyolefin (TPO) can be used for the outer show surface layer 16 (e.g., leather, urethane, thermoplastic polyurethane (TPU) or any other suitable material).

In addition and as will be discussed herein, the sensor and lighting element 14 is secured to a back side 21 of the outer show surface layer 16. As such, the sensor and lighting element 14 is directly secured to the back side 21 of the outer show surface layer 16. In other words, no other components are located between the back side 21 of the outer show surface layer 16 and the sensor and lighting element 14.

The sensing and lighting element 14 includes three major components namely, a base layer or sensor element 22, a mid-layer or light emitting diode (LED) frame or light emitting diode (LED) sub-assembly 24 and an upper layer 26 as shown in FIGS. 2 and 3. Referring now to at least FIGS. 2-6, the base layer or sensor element 22 includes a plurality of sensor elements 28, a ground plane 30, and associated traces 32 all located on a thin, stretchable film 34. As used herein stretchable film 34 is intended to cover materials capable of elastic deformation without breaking or degradation. It is also understood that the stretchable film 34 is also flexible. In one exemplary embodiment of the present disclosure the plurality of sensor elements 28 are capacitive sensor elements.

The thin stretchable film 34 provides the basis or surface for printing conductive and other inks on a top side and its opposite side (without the conductive inks) provides the basis or surface for bonding a polyurethane (PU) foam thereto. The thin stretchable film 34 also provides for thread retention during a subsequent sewing step. The ground plane 30 and associated traces 32 as well as the sensor elements 28 are formed from a stretchable durable conductive ink applied to the thin stretchable film 34. As used herein a stretchable durable conductive ink is intended to cover inks that are capable of elastic deformation without fatal degradation (e.g., breaking of the conductive path). Also shown are dielectric bridges 36 formed from a dielectric ink that allows the signal traces to cross over the ground plane 30 wherein applicable depending on the type of sensor element 28 (e.g., a slider sensor element). In addition, a plurality of carbon pads 38 are provided to provide improved electrical connection at the termination points of the electrical traces 32.

A monochrome layer or ink 40 is printed over the sensor elements 28. The monochrome layer 40 hides the visibility of the sensor elements 28, improves light management, and protects the printed ink from degradation. In one embodiment, the monochrome layer 40 may not need to cover all of the silver ink sensor elements 28 if a subsequent overmolding step (as will be discussed below) provides sufficient protection.

Also shown is a reflective dot pattern 42 that is applied to the monochrome layer 40. The reflective dot pattern 42 comprises a reflective ink and provides light uniformity at the icon 18 area. Prior to the application of the mid layer or LED frame or LED sub assembly 24 to the base layer or sensor element 22, the base layer or sensor element 22 is trimmed. Also, the base layer or sensor element 22 may be provided with a plurality of locating points 44 for the mid layer or LED frame or LED sub assembly 24.

Referring now to at least FIGS. 1-8, the mid layer or LED frame or LED sub assembly 24 includes a flexible frame 46 that carries a plurality of light emitting diodes (LEDs) 48 and their associated traces 50. The LEDs 48 illuminate the icons 18 when an associated sensor element 28 is activated. In one non-limiting embodiment, the LEDs 48 are side firing or side emitting single color LEDs. Of course, any other suitable type of LEDs may be used. The mid layer or LED frame or LED sub assembly 24 is bonded to the base layer or sensor element 22 on top of the monochrome layer 40 such that the LEDs 48 are positioned to illuminate an area proximate to an associated sensor element 28 and its associated icon 18. See at least FIG. 8. At this point the sub assembly comprising the base layer or sensor element 22 and the mid layer or light emitting diode (LED) frame or light emitting diode (LED) sub-assembly 24 is ready for over molding. Alternatively, the mid layer or light emitting diode (LED) frame or light emitting diode (LED) sub-assembly 24 can be over molded and become its own sub component.

Referring now to at least FIGS. 1-10, the upper layer 26 is a molded-on layer that includes light guides 52 and a blackout material 54 that is molded onto the assembly comprising the base layer or sensor element 22 and the mid layer or light emitting diode (LED) frame or light emitting diode (LED) sub-assembly 24. The light guides 52 comprise an optically clear silicone while the blackout material 54 comprises a black or opaque silicone. These materials are molded onto the base layer or sensor element 22 and the mid layer or light emitting diode (LED) frame or light emitting diode (LED) sub-assembly 24 via a two shot molding process.

The optically clear silicone comprising the light guides 52 is molded directly onto the sub assembly comprising the base layer or sensor element 22 and the mid layer or light emitting diode (LED) frame or light emitting diode (LED) sub-assembly 24 as the first of two silicone molding operations. These light guides 52 will transmit light from the LEDs 48 to the icons 18. The light guides 52 will also cover the LEDs 48 so that a user cannot feel the LED's 48 in the final assembly. In other words, the thickness of the light guides 52 is large enough such that a user cannot feel the LEDs 48 through the upper layer 26. In other words, a user's finger will not be able to feel the LEDs 48 through the upper layer 26.

It is desired that optical coupling occurs with the LEDs 48 as well as the monochrome ink 40 and reflective ink 42 on the base layer or sensor element 22. The optically clear silicone comprising the light guides 52 should have the same or better stretch as the base film 34. In one non-limiting embodiment the shore "A" hardness of the light guides 52 should be 55 to 60.

The blackout silicone 54 is molded directly onto the subassembly comprising the base layer or sensor element 22 and the mid layer or light emitting diode (LED) frame or light emitting diode (LED) sub-assembly 24. The blackout silicone 54 is the second of two silicone molding operations. The blackout element 54 reduces light bleed from one icon 18 to another. It also fills out the surrounding area providing a level surface with the light guides 52. The hardness and shrink levels of the blackout element 54 should be as close to the optically clear silicone 52 as possible. In addition, it is desirable to have the same final thickness of the sensor and lighting element 14. As such, the light guides 52 and the blackout silicone 54 should be flush with each other.

It is assumed that the top layer will be a two-shot process likely in silicone. This combination of sub-assemblies can be broken up different ways. For instance, the LED element can be combined with the silicone element as its own sub assembly. Materials discussed here are only one possible selection. It is also understood that other clear materials for the light guides 52 may be employed. For example, an optically clear polyurethane may be used for the light guides 52 instead of silicone. In yet another embodiment, a precut sheet of opaque silicon will provide the blackout silicone portion 54 and this sheet will be provided with cut out portions that define the light guides 52. This sheet may be applied and adhered to the subassembly comprising the base layer or sensor element 22 and the mid layer or light emitting diode (LED) frame or light emitting diode (LED) sub-assembly 24 with an adhesive. Thereafter, the light guides 52 comprising a small sheet of silicone configured to fit within a respective one of the cutout portions is inserted therein and is potted in place with a silicone material. Alternatively, an optically clear silicone is molded into the cutout portions of the sheet of blackout material 54.

At this point, a top surface of the light guides 52 and the blackout silicone 54 is cleaned and an optically clear primer or treatment 56 is applied. The optically clear primer or treatment 56 assures proper adhesion to the sensor and lighting element 14 to the outer show surface layer 16. In an alternative embodiment, the primer or treatment 56 may not be necessary based on the final material selections.

Figure 12:
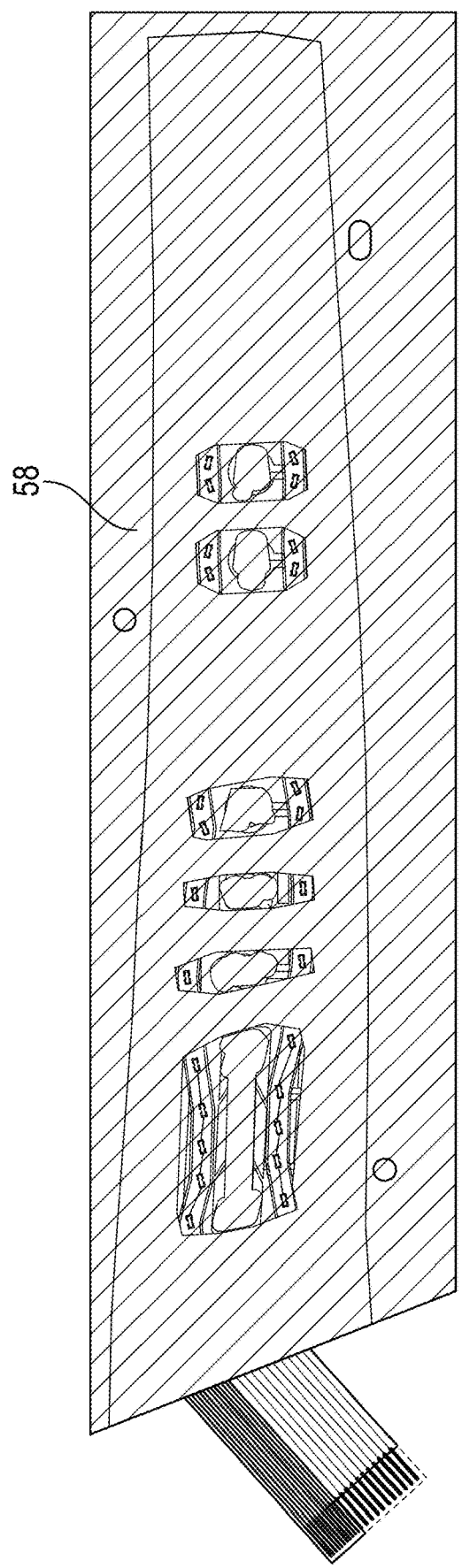
Figure 13:
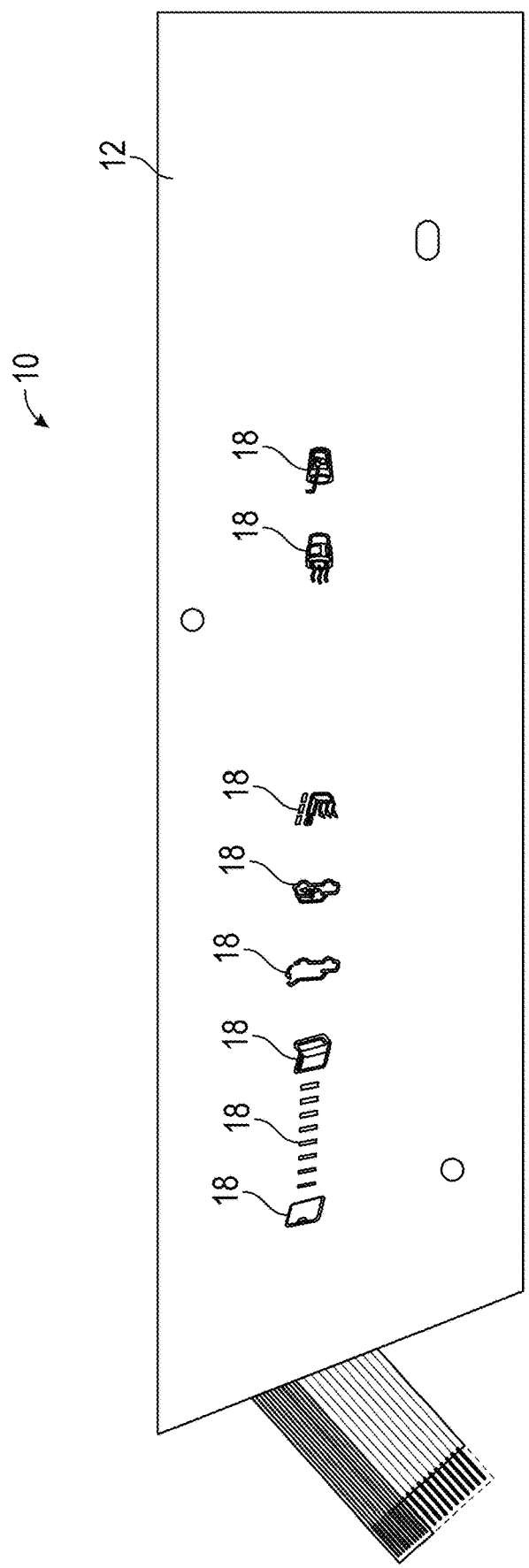
FIGS. 13-15 are views illustrating a portion of the trim component with flexible capacitive sensors in accordance with one non-limiting embodiment of the present disclosure.
Figure 14:
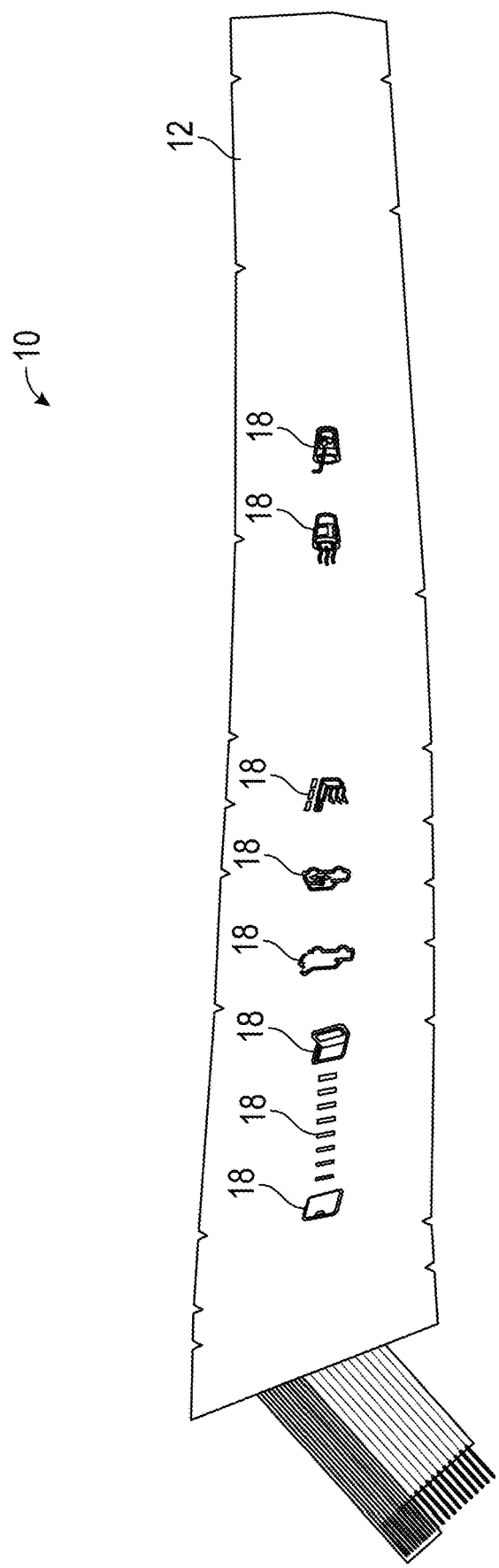
Figure 15:
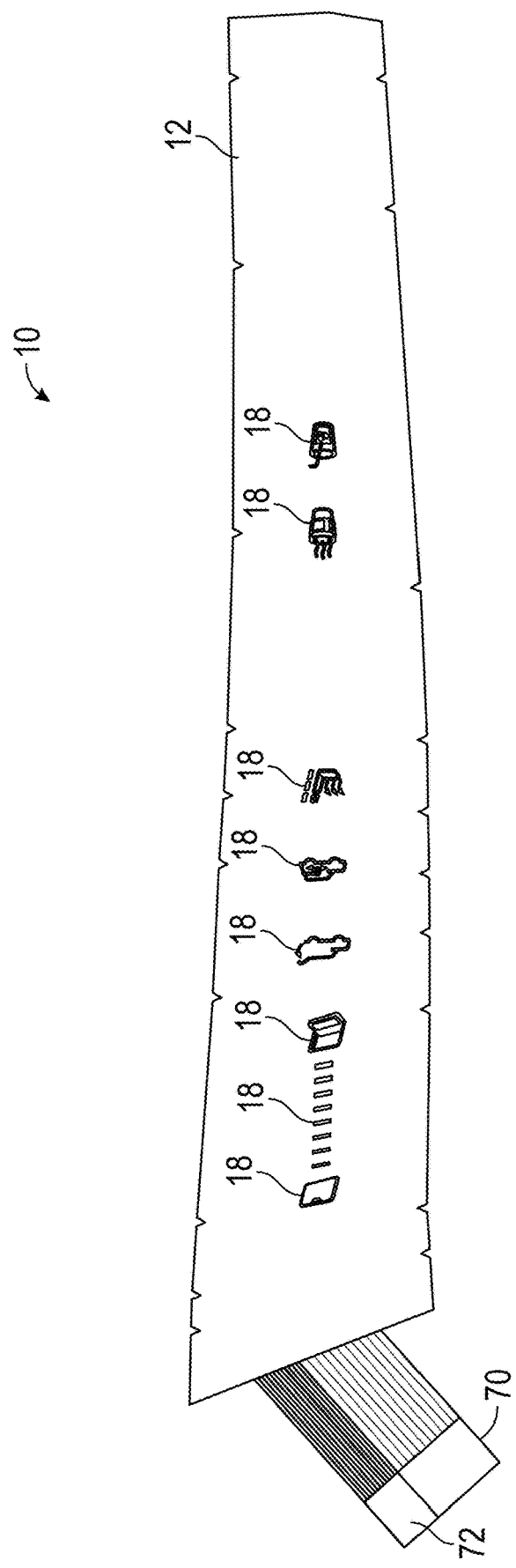

At this point and referring now to at least FIGS. 1-15, the sensor and lighting element 14 is now ready to be adhered or laminated to the outer show surface layer 16. In FIG. 12 an optically clear adhesive 58 is applied to the top surface of the sensor and lighting element 14. This top surface will be directly secured to the inner surface or back side 21 of the outer show surface layer 16. It is understood that there are many ways to bond the sensor and lighting element 14 to the outer show surface layer 16. The adhesive 58 must be optically clear, temperature stable, flexible and have the desired peel strengths for the desired application.

Once the sensor and lighting element 14 is adhered or laminated to the outer show surface layer 16, the outer show surface layer 16 is trimmed and terminals 70 and 72 are crimped onto the terminals of the base layer or sensor element 22 and the mid layer or light emitting diode (LED) frame or light emitting diode (LED) sub-assembly 24. At this point the portion 12 of the trim component 10 with flexible capacitive sensors is now provided in accordance with various embodiments of the present disclosure. See at least FIGS. 14 and 15.

The portion 12 now contains all of the functionality of the final part and is ready to be sewn to other components such as side panels 74 that extend from the portion 12 of the trim component 10. Although only one side panel is shown in FIG. 1 at least two side panels 74 and if necessary, other panels are contemplated to be sewn to the portion 12.

During this sewing step the components (e.g., portion 12 and side panels 74) are sewn together creating a sub-assembly to be wrapped onto a foam covered substrate. After the sewing step, an adhesive is applied to a scrim side of the sewn assembly (portion 12 and side panels 74). In one embodiment, it may be necessary to apply adhesive to both components (e.g., foam covered substrate and portion 12 with side panels 74) to be bonded together. In yet another embodiment, there may be no need to apply an adhesive is applied to a scrim side of the sewn assembly (portion 12 and side panels 74) if applying adhesive to the foam-substrate sub-assembly is sufficient.

The portion 12 and side panels 74 are now bonded to the foam covered substrate using bonding techniques know to those skilled in the related arts (e.g., bladder lamination). Thereafter, the edge of the part or component 10 are manually wrapped and the trim component 10 is ready to be used.

Figure 16:
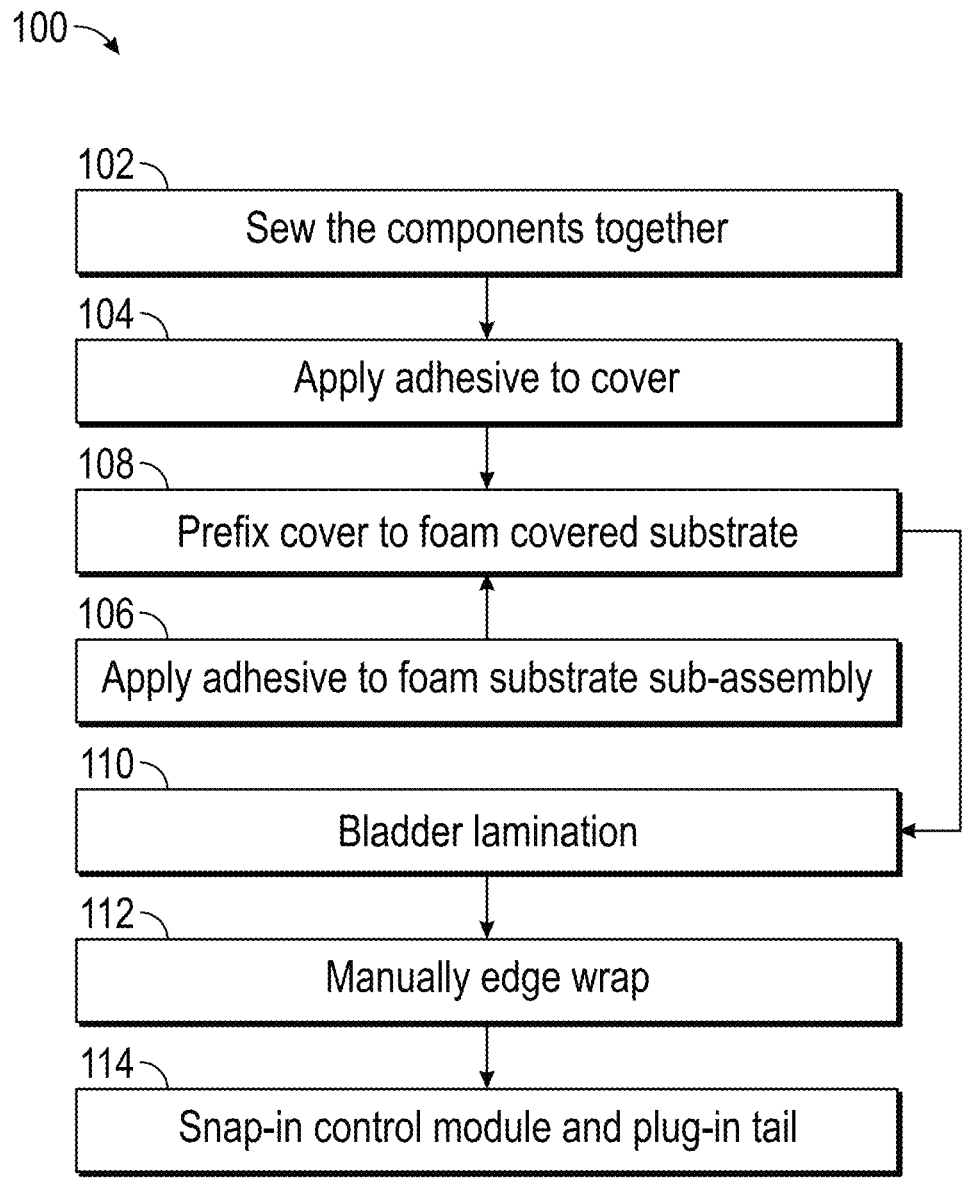
FIG. 16 is a flow chart illustrating a method of assembling a trim component in accordance with one non-limiting embodiment of the present disclosure.

Referring now to FIG. 16, a flow chart 100 illustrating a method of assembling the final trim component 10 is illustrated. In step 102, the portion 12 is sewn to other components such as side panels 74 that extend from the portion 12 of the trim component 10. Although only one side panel is shown in FIG. 1 at least two side panels 74 and if necessary, other panels are contemplated to be sewn to the portion 12. Thereafter and at step 104 an adhesive is applied to a scrim side of the sewn assembly (portion 12 and side panels 74). In one embodiment, it may be necessary to apply adhesive to both components (e.g., foam covered substrate and portion 12 with side panels 74) to be bonded together. See step 106. In yet another embodiment, there may be no need to apply an adhesive to a scrim side of the sewn assembly (portion 12 and side panels 74, step 104) if applying adhesive to the foam-substrate sub-assembly (step 106) is sufficient. Thereafter and in step 108, the portion 12 and side panels 74 are prefixed to a foam covered substrate. In step 110, the portion 12 and side panels 74 ae now bonded to the foam covered substrate using bonding techniques know to those skilled in the related arts (e.g., bladder lamination). There and at step 112, the edge of the part or component 10 are manually wrapped and the trim component 10 and in step 114, a hardware module is snapped into position and the flexible leads of the part or component 10 are plugged into he hardware module and the part or component 10 is ready to be used.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A trim element, comprising:
   a sensor element and lighting element; and
   an outer show surface layer, wherein the sensor element and lighting element is directly secured to a back side of the outer show surface layer, wherein the sensor element and lighting element includes a base layer; a light emitting diode (LED) frame;
   and an upper layer.

2. The trim element as in claim 1, wherein the outer show surface layer is formed from a thermoplastic polyolefin with a plurality of hidden icons that are only visible from an exterior show surface of the outer show surface layer when they are illuminated by a light source of the sensor element and lighting element.

3. The trim element as in claim 1, wherein the sensor element and lighting element includes flexible capacitive sensors.

4. The trim element as in claim 1, wherein the base layer includes a plurality of sensor elements, a ground plane, and associated traces all located on a stretchable film.

5. The trim element as in claim 4, wherein the plurality of sensor elements are flexible capacitive sensors.

6. The trim element as in claim 4, wherein a monochrome layer is printed over the plurality of sensor elements.

7. The trim element as in claim 6, wherein a reflective dot pattern is applied to the monochrome layer.

8. The trim element as in claim 1, wherein the light emitting diode (LED) frame includes a flexible frame that carries a plurality of light emitting diodes (LEDs).

9. The trim element as in claim 8, wherein the plurality of light emitting diodes (LEDs) are side firing light emitting diodes.

10. The trim element as in claim 1, wherein the upper layer is a molded-on layer that includes light guides and a blackout material each being separately molded onto an assembly comprising the base layer and the light emitting diode (LED) frame.

11. The trim element as in claim 10, wherein the light guides comprise an optically clear silicone while the blackout material comprises a black silicone.

12. The trim element as in claim 11, wherein the optically clear silicone and the black silicone are applied via a two shot molding process.

13. The trim element as in claim 11, wherein the optically clear silicone is of a thickness that prevents a user from feeling a plurality of light emitting diodes (LEDs) of the light emitting diode (LED) frame through the outer show surface layer.

14. The trim element as in claim 1, wherein the sensor element and lighting element is directly secured to the back side of the outer show surface layer via an optically clear adhesive.

15. The trim element as in claim 1, wherein the trim element is an interior trim piece of a vehicle.

16. A method of forming a trim element, comprising:
securing a sensor element and lighting element to an outer show surface layer, wherein the sensor element and lighting element is directly secured to a back side of the outer show surface layer, wherein the sensor element and lighting element includes a base layer; a light emitting diode (LED) frame; and an upper layer.

17. The trim element as in claim 16, wherein the outer show surface layer is formed from a thermoplastic polyolefin with a plurality of hidden icons that are only visible from an exterior show surface of the outer show surface layer when they are illuminated by a light source of the sensor element and lighting element.

18. The method as in claim 16, wherein the base layer includes a plurality of sensor elements, a ground plane, and associated traces all located on a stretchable film.

19. The method as in claim 18, wherein the upper layer is a molded-on layer that includes light guides and a blackout material each being separately molded onto an assembly comprising the base layer and the light emitting diode (LED) frame.

* * * * *